United States Patent Office 2,783,239
Patented Feb. 26, 1957

2,783,239

5-ACYLIMINO-4-MONONUCLEAR-ARYL-SUBSTITUTED-$\Delta^2$-1,3,4-THIADIAZOLINE - 2 - SULFONAMIDES Richard W. Young, Riverside, and Melinda J. Muller, Stamford, Conn., assignors to American Cyanamid Company, New York, N. Y., a corporation of Maine No Drawing. Application January 23, 1956,
Serial No. 560,866

10 Claims. (Cl. 260—306.8)

This invention relates to novel organic compounds and more particularly is concerned with the preparation of 5-acylimino-4-mononuclear-aryl-substituted - $\Delta^2$ - 1,3,4-thiadiazoline-2-sulfonamides which may be represented by the following general formula:

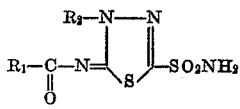

wherein $R_1$ is a hydrogen atom, a lower alkyl radical or a monocyclic aralkyl radical, and $R_2$ is a monocyclic aryl radical. Suitable lower alkyl substituents are methyl, ethyl, propyl, isopropyl, butyl, pentyl, amyl, hexyl, etc.; suitable aralkyl substituents are benzyl, phenethyl, phenylpropyl, phenylbutyl, etc.; and suitable aryl substituents are exemplified by phenyl and substituted phenyl, suitable substituents on the phenyl ring being —Cl, —Br, —I, —NO$_2$, and lower alkyl radicals containing from 1 to 4 carbon atoms.

The compounds of this invention are excellent natriuretic agents, that is agents which enhance the excretion of sodium in the urine without necessarily changing the normal volume of urine excreted. The compounds may be administered orally and have been found to be effective in dosages of from 5 mg. to 100 mg. per kilogram of body weight.

The compounds may be prepared by chlorinating an appropriate 5-acylimino-4-mononuclear-aryl-substituted-2-benzylmercapto-$\Delta^2$-1,3,4-thiadiazoline to form the corresponding 2-sulfonylchloride derivative. The chlorination reaction may be accomplished smoothly and in good yield by passing chlorine gas through either a suspension or a solution of the thiadiazoline in a suitable acid. The resulting sulfonylchloride is then converted to the corresponding sulfonamide by treatment with liquid ammonia or ammonium hydroxide, filtering, acidifying with an appropriate mineral acid and the product may be purified by recrystallization in a standard manner. Suitable acids for the chlorination reaction are glacial acetic acid, propionic acid, butyric acid, hydrochloric acid, etc. The temperature of the chlorination reaction is preferably from about 0° to 30° C. The amidation of the sulfonylchloride to the final product is preferably carried out by treatment with an excess of liquid ammonia or ammonium hydroxide for a period varying from about 15 minutes to about 2 hours, the excess ammonia being then removed by evaporation and the final product is separated and purified by recrystallization.

The 5 - acylimino - 4 - mononuclear-aryl-substituted-2-benzylmercapto-$\Delta^2$-1,3,4-thiadiazoline, which is used as the starting material for the preparation of the novel compounds herein, is preferably prepared according to the procedure described and claimed in the copending application of Richard W. Young, Kathryn H. Wood, and Melinda J. Muller, Serial No. 560,865, filed concurrently herewith. Briefly this procedure involves reacting a suitable acyl isothiocyanate, such as acetylisothiocyanate, and a suitable 3-substituted dithiocarbazate, such as 3-phenylbenzyldithiocarbazate, under reflux in a suitable non-hydroxylated organic solvent such as toluene or dimethylformamide, until solution is obtained. The solvent is removed by distillation and the resulting thiadiazoline sulfide may be recovered and purified in a suitable manner.

The process by which the novel compounds of this invention may be prepared is illustrated schematically below using 5 - acetylimino-4-phenyl-2-benzylmercapto-$\Delta^2$-1,3,4-thiadiazoline as an example of an appropriate 4-mononuclear-aryl-substituted thiadiazoline sulfide:

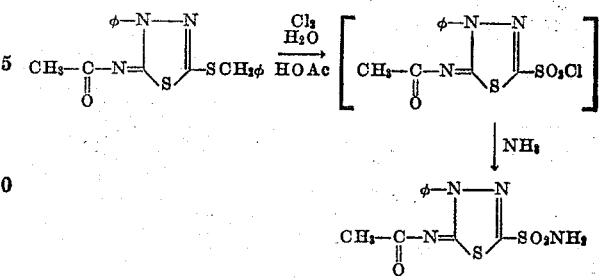

The invention will be described in greater detail in conjunction with the following specific examples in which the parts are by weight unless otherwise specified.

EXAMPLE 1

*5-acetylimino-4-phenyl-$\Delta^2$-1,3,4-thiadiazoline-2-sulfonamide*

16.4 parts of 5-acetylimino-4-phenyl-2-benzylmercapto-$\Delta^2$-1,3,4-thiadiazoline was dissolved in 98 parts by volume of hot glacial acetic acid. The solution was stirred and 9.8 parts of water was added, causing some precipitation. The mixture was then cooled slowly to get fine crystals. The stirred mixture was chlorinated at 15° C. for 1½ hours by bubbling in chlorine. The color of the slurry changed from orange to pale yellow. The reaction mixture was then filtered and the solid washed well with ice water. The sulfonylchloride was slurried in cold absolute ether and filtered. The sulfonylchloride was then added to 300 parts by volume of liquid ammonia slowly with stirring. The solution was concentrated to dryness. The residue was treated with 200 parts of water and most of the solid dissolved. The suspension was treated with activated charcoal and filtered. The filtrate was cooled and made acidic with 6N HCl to give a white solid, melting point 240–248° C. The sulfonamide was dissolved in 500 parts by volume of hot methyl ethyl ketone. The recrystallized sulfonamide had a melting point of 249–250° C.

EXAMPLE 2

*5-acetylimino-4-(m-tolyl)-$\Delta^2$-1,3,4-thiadiazoline-2-sulfonamide*

The procedure of the preceding example was followed using 40 parts of 5-acetylimino-4-(m-tolyl)-2-benzylmercapto-$\Delta^2$-1,3,4-thiadiazoline, 150 parts by volume of glacial acetic acid and 12 parts of water. The benzylmercapto compound dissolved in the glacial acetic after several minutes of bubbling in chlorine. Chlorine addition was continued for one hour. After precipitation of the sulfonamide, the product was recrystallized from 650 parts by volume of 95% alcohol to give a purified product having a melting point of 239–240° C.

EXAMPLE 3

*5 - acetylimino - 4 - (p - chlorophenyl) - $\Delta^2$ - 1,3,4-thiadiazoline-2-sulfonamide*

The procedure of the preceding examples was followed using 2.9 parts of 5-acetylimino-4-(p-chlorophenyl)-2-benzylmercapto-$\Delta^2$-1,3,4-thiadiazoline, 25 parts by volume of glacial acetic acid and 1 part of water. The benzylmercapto compound dissolved in the acetic acid after stirring for several minutes. The chlorine was bubbled for 20 minutes. The sulfonamide was reprecipitated, then recrystallized twice from methanol to give a purified product having a melting point of 230–232° C.

EXAMPLE 4

*5 - acetylimino - 4 - (p - bromophenyl) - $\Delta^2$ - 1,3,4-thiadiazoline-2-sulfonamide*

The procedure of the preceding examples was followed using 1.7 parts of 5-acetylimino-4-(p-bromophenyl)-2-benzylmercapto-$\Delta^2$-1,3,4-thiadiazoline, 15 parts by volume of glacial acetic acid and 1 part of water. The benzylmercapto compound was dissolved in the acetic acid and chlorine was bubbled in for 25 minutes. The sulfonamide was recrystallized from 95% alcohol to give a purified product having a melting point of 235–236° C.

The following compounds may be readily prepared by following the procedure of the preceding examples, employing as the starting material the appropriate 5-acylimino - 4 - mononuclear - aryl - substituted - 2-benzylmercapto - $\Delta^2$ - 1,3,4 - thiadiazoline: 5 - formylimino - 4 - phenyl - $\Delta^2$ - 1,3,4 - thiadiazoline - 2 - sulfonamide, 5 - propionylimino - 4 - (p - iodophenyl)-$\Delta^2$ - 1,3,4 - thiadiazoline - 2 - sulfonamide, 5 - butyrylimino - 4 - (p - acetamidophenyl) - $\Delta^2$ - 1,3,4 - thiadiazoline - 2 - sulfonamide, 5 - valyrylimino - 4 - (m-methoxyphenyl) - $\Delta^2$ - 1,3,4 - thiadiazoline - 2 - sulfonamide, 5 - phenacetylimino - 4 - (3,4 - dichlorophenyl) - $\Delta^2$ - 1,3,4 - thiadiazoline - 2 - sulfonamide, and 5 - isobutyrylimino - 4 - (p - isopropylphenyl)-$\Delta^2$-1,3,4-thiadiazoline-2-sulfonamide.

We claim:

1. 5 - acylimino - 4 - mononuclear - aryl - substituted-$\Delta^2$-1,3,4-thiadiazoline-2-sulfonamides of the formula:

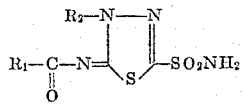

wherein $R_1$ is selected from the group consisting of a hydrogen atom, a lower alkyl radical and a phenyl-lower-alkyl radical, and $R_2$ is selected from the group consisting of phenyl, halo-substituted phenyl, lower alkyl-substituted phenyl, lower alkoxy-substituted phenyl, amido-substituted phenyl, and nitro-substituted phenyl radicals.

2. 5 - acetylamino - 4 - phenyl - $\Delta^2$ - 1,3,4 - thiadiazolone-2-sulfonamide.

3. 5 - acetylimino - 4 - (m - tolyl) - $\Delta^2$ - 1,3,4-thiadiazoline-2-sulfonamide.

4. 5 - acetylimino - 4 - (p - chlorophenyl) - $\Delta^2$-1,3,4-thiadiazoline-2-sulfonamide.

5. 5 - acetylimino - 4 - (p - bromophenyl) - $\Delta^2$-1,3,4-thiadiazoline-2-sulfonamide.

6. The method of preparing 5-acylimino-4-mononuclear - aryl - substituted - $\Delta^2$ - 1,3,4 - thiadiazoline - 2-sulfonamides of the formula:

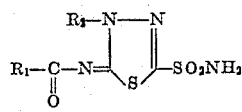

wherein $R_1$ is selected from the group consisting of a hydrogen atom, a lower alkyl radical and a phenyl-lower-alkyl radical, and $R_2$ is selected from the group consisting of phenyl, halo-substituted phenyl, lower alkyl-substituted phenyl, lower alkoxy-substituted phenyl, amido-substituted phenyl, and nitro-substituted phenyl radicals which comprises chlorinating the corresponding 5-acylimino - 4 - mononuclear - aryl - substituted - $\Delta^2$ - 1,3,4-thiadiazoline-2-sulfide to obtain the corresponding sulfonylchloride and then reacting the sulfonylchloride derivative with ammonia.

7. The method of preparing 5-acetylimino-4-phenyl-$\Delta^2$-1,3,4-thiadiazoline-2-sulfonamide which comprises chlorinating 5 - acetylimino - 4 - phenyl - 2 - benzylmercapto--$\Delta^2$-1,3,4-thiadiazoline to obtain the corresponding sulfonylchloride and then reacting the sulfonylchloride derivative with ammonia.

8. The method of preparing 5-acetylimino-4-(m-tolyl)-$\Delta^2$-1,3,4-thiadiazoline-2-sulfonamide which comprises chlorinating 5-acetylimino-4-(m-tolyl)-2-benzylmercapto-$\Delta^2$-1,3,4-thiadiazoline to obtain the corresponding sulfonylchloride and then reacting the sulfonylchloride derivative with ammonia.

9. The method of preparing 5-acetylimino-4-(p-chlorophenyl)-$\Delta^2$-1,3,4-thiadiazoline-2-sulfonamide which comprises chlorinating 5-acetylimino-4-(p-chlorophenyl)-2-benzylmercapto-$\Delta^2$-1,3,4-thiadiazoline to obtain the corresponding sulfonylchloride and then reacting the sulfonylchloride derivative with ammonia.

10. The method of preparing 5-acetylimino-4-(p-bromophenyl) - $\Delta^2$ - 1,3,4 - thiadiazoline - 2 - sulfonamide which comprises chlorinating 5-acetylimino-4-(p-bromophenyl) - 2 - benzylmercapto - $\Delta^2$ - 1,3,4 - thiadiazoline to obtain the corresponding sulfonychloride and then reacting the sulfonylchloride derivative with ammonia.

References Cited in the file of this patent
UNITED STATES PATENTS 2,554,816    Clapp et al. _____ May 29, 1951